United States Patent [19]

Victor et al.

[11] 4,343,195
[45] Aug. 10, 1982

[54] FLOW MEASURING DEVICE

[76] Inventors: Michael Victor, 41226 I-94 Expressway Service Dr., Van Buren Township, Wayne County, Belleville, Mich. 48111; James R. Bowers, 1471 Lakeview Ave., Rocky River, Ohio 44116

[21] Appl. No.: 170,681

[22] Filed: Jul. 21, 1980

[51] Int. Cl.³ ............................................. G01F 1/46
[52] U.S. Cl. .................................................. 73/861.66
[58] Field of Search ........... 73/861.65, 861.66, 861.67, 73/861.68

[56] References Cited

U.S. PATENT DOCUMENTS

| | | | |
|---|---|---|---|
| 1,087,988 | 2/1914 | Sheldon | 73/861.66 |
| 1,110,023 | 9/1914 | Wilkinson | 73/861.65 |
| 1,250,238 | 2/1917 | Spitzglass | 73/861.66 |
| 1,374,359 | 4/1921 | Collins | 73/861.65 |
| 2,679,163 | 5/1954 | Morris et al. | 73/861.65 |
| 3,751,982 | 8/1973 | Lambert | 73/861.66 |

*Primary Examiner*—Herbert Goldstein

[57] ABSTRACT

A pitot tube having a series of pressure sensing ports on the upstream side of the tube and a second series of pressure sensing openings on the downstream side of the tube. A longitudinal internal wall in the tube forms a pair of chambers, one of which communicates with the upstream ports and the second which communicates with the downstream ports. A plate attached to the end of the tube has diverging passages communicating with the two chambers, the plate forming a flange for connecting a manifold, a transmitter for indicating the flow pressures sensed by the ports, a gauge or the like.

7 Claims, 4 Drawing Figures

FLOW MEASURING DEVICE

BACKGROUND OF THE INVENTION

This invention is related to flow measuring devices, and more particularly to a pitot tube having a pair of internal chambers each in communication with a series of pressure sensing ports in the tube wall, and a plate attached to the end of the tube with a pair of passages communicating with the two chambers, the plate being suited for connection to a conventional valve manifold, or a flow instrument such as a differential pressure device or gauge, to totalizer recorder or the like.

A commercial form of pitot tube is inserted in a pipe in which the fluid flow is to be measured, the tube being supported transversely to the direction of fluid motion. The tube has a pair of internal chambers each fluidly connected to a series of sensing ports on opposite sides of the tube.

Conventionally, such a pitot tube has its ends formed with pipe thread connections. Various piping, manifolds, and transmitters are then connected to the threaded ends to each chamber to measure the pressure differential sensed by the tube.

Several problems are associated with such an arrangement. The pipe threads provide a source for leakage. A considerable amount of piping is often necessary to accomodate various measuring and sensing devices, some of which require a separate mounting structure.

SUMMARY OF THE INVENTION

The broad purpose of the present invention is to provide a pitot tube having a pair of internal chambers, sensing ports on opposite sides of the tube in communication with the two chambers for measuring fluid flow upstream and downstream of the pitot element, and a plate attached to the end of the element to form a flange suitable for attachment to a variety of pressure sensing instruments.

Another object of the invention is to provide means for mounting both ends of a pitot tube in a fluid conduit.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
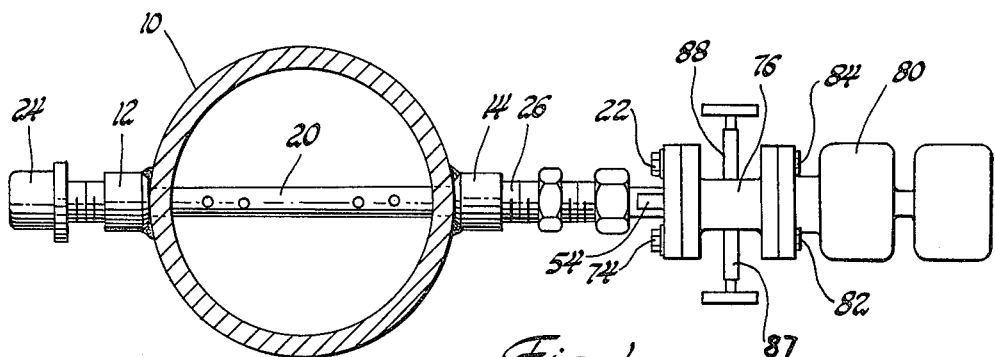
FIG. 1 illustrates a pitot tube mounted in a fluid-delivering conduit to illustrate the preferred embodiment of the invention.
Figure 2:
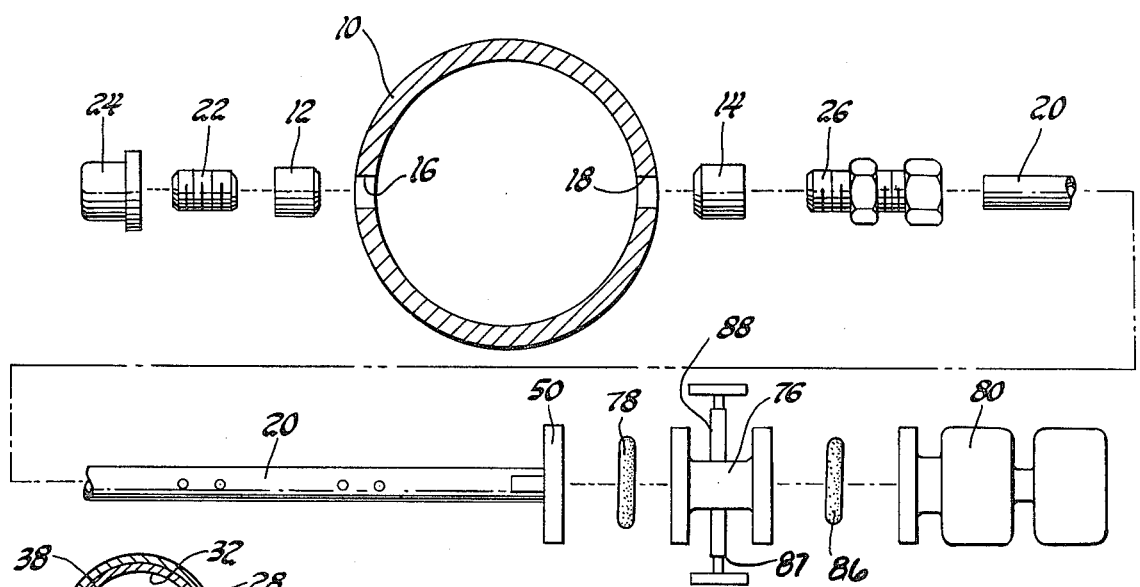
FIG. 2 is an exploded view of the embodiment of FIG. 1.

Referring to the drawing, FIG. 1 illustrates the cross section of a conduit 10 for delivering a fluid, such as a gas. A forged steel, internally threaded support member 12 is welded to one side of the conduit. A second forged steel support member 14 is welded to the opposite side of the conduit. Support members 12 and 14 are aligned with openings 16 and 18 formed in the conduit wall.

A tubular pitot element 20 is received in support members 12 and 14 such that the midsection of the element is supported in the conduit, as illustrated in FIG. 1. A nipple 22 is threadably inserted in support member 12 and receives the end of element 20. A cap 24 is mounted on the outer end of nipple 22 and element 20.

A packing gland 26 is threadably inserted in support 14. Packing gland 26 receives element 20, and is threadably received in support 14 to form a fluid tight seal between the element and the support member.

Figure 4:
FIG. 4 is a view taken along lines 4—4 of FIG. 3.
Figure 3:
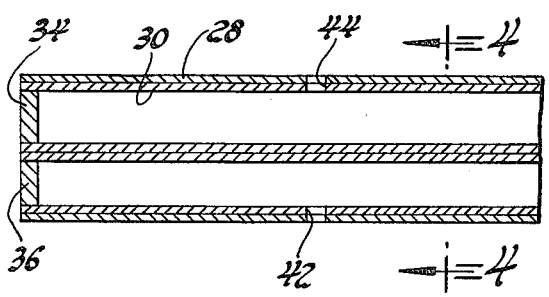
FIG. 3 is an enlarged sectional view of the tube.
Figure 3:
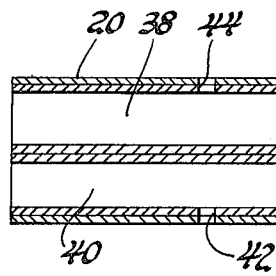
Figure 3:
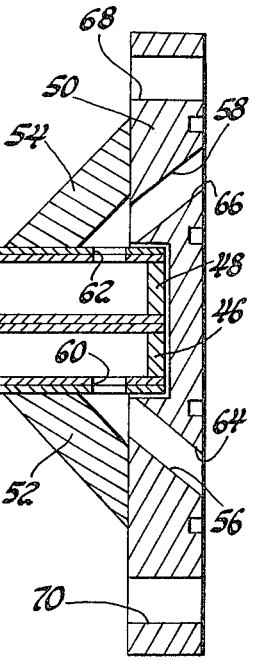

Referring to FIGS. 3 and 4, element 20 comprises an outer tubular housing 28 which is shrunk onto a pair of D-shaped back-to-back inner tubes 30 and 32. A pair of plugs 34 and 36 block off the outer end of tubes 30 and 32 to define a pair of longitudinal internal chambers 38 and 40. Element 20 has a series of sensing ports 42 in communication with chamber 40, and a second series of sensing ports 44 in fluid communication with chamber 38.

A pair of plugs 46 and 48 plug the inner ends of chambers 38 and 40.

A plate 50 is welded to the end of housing 28, and a pair of web members 52 and 54 are in turn welded to the corners formed between housing 28 and plate 50. Passages 56 and 58 diverge from ports 60 and 62, respectively, such that the outer ends of the passages terminate in openings 64 and 66 in the plate. The outer ends of the passages are spaced a distance greater than the diameter of housing 28.

Plate 50 preferably has four mounting holes 68 and 70 (only two shown) for receiving fastener means 72 and 74 as illustrated in FIG. 1. A conventional manifold 76 is connected by fastener means 72 and 74 to the plate, the manifold having internal passages (not shown) in fluid communication with the outlet of passages 56 and 58. An O-ring 78 provides a seal between plate 50 and manifold 76.

A conventional transmitter 80, for sensing the differential pressure between ports 42 and 44, is attached by threaded fasteners 82 and 84 (preferably four such fasteners), to the manifold, and an O-ring 86 provides a seal between manifold 76 and transmitter 80.

Valves 87 and 88, mounted on the manifold, provide means for opening and closing fluid communication between the manifold and the transmitter.

In use, element 20 is mounted in conduit 10 by the supports on opposite sides of the conduit wall. The manifold and transmitter are then bolted on the plate 50 to sense the flow in conduit 10. It is to be noted that the manner in which the plate is integrally attached to the end of the pitot tube element eliminates the conventional pipe thread connection between the pitot tube and the transmitter, as well as a considerable amount of piping usually associated with such arrangements.

The invention is applicable to pitot tube elements having other forms of internal structure for forming a chamber from the sensing ports to the plate, such as the type in which a smaller tube is mounted in the tubular housing and attached to one side of the interior wall.

The plate is suited for fastening to any suitable pressure sensing instrument or for instruments such as of the type that measure stack gases and the like.

Having described my invention, we claim:

1. Pitot tube means suited for connecting a pressure responsive instrument without connecting tubing, comprising:

an elongated housing having a first port and a second port;

a pair of similarly shaped D-shaped tubes telescopically disposed back-to-back in said housing and extending substantially the full length of said housing, including a first tube having a first chamber and an opening fluidly connecting said first chamber with said first port, and a second tube having a second chamber and an opening fluidly connecting the second chamber with the second port;

a plate mounted on the end of said housing, and means attaching said plate to the housing, said plate having a pair of passages diverging from the housing and extending from one side of the plate to the opposite side thereof, the outer ends of said passages being spaced a distance greater than the diameter of the housing;

one of said passages being fluidly connected to the first fluid chamber and the second of said passages being fluidly connected to the second fluid chamber;

said plate having a flange, and opening means for receiving fastener means, said plate being adapted to be mounted in face-to-face relationship with the flange of instrument means without tubing being disposed between the plate and the instrument.

2. A combination as defined in claim 1, in which the plate means is welded to the end of said elongated housing.

3. A combination as defined in claim 1, including web means disposed in the corner formed by said housing and the plate means, said passages being formed through the web means.

4. A pitot tube means as defined in claim 1, in which the flange of the plate has four openings for receiving fastener means for connecting the flange of an instrument to said plate in aligned fastener openings.

5. Pitot tube means, comprising:
an elongated housing having a first port and a second port;

plate means integrally connected to one end of said housing, the border of said plate means defining a flange having openings for receiving fastener means;

web means disposed in the corner formed by said housing and the plate means;

a pair of passages diverging from the housing through the web means and the plate means; and first means in said housing forming a first chamber fluidly connecting said first port to one of said pair of passages, and a second chamber fluidly connecting the second port to the second of said pair of passages.

6. Pitot tube means as defined in claim 1, including:
first support means adapted to removably support one end of said elongated housing on one side of a conduit, and second support means adapted to support the opposite end of said elongated housing on the opposite side of said conduit.

7. Pitot tube means as defined in claim 5, including:
first support means adapted to removably support one end of said elongated housing on one side of a conduit; and second support means adapted to support the opposite end of said elongated housing on the opposite side of said conduit.

* * * * *